United States Patent [19]

Yanagishita

[11] Patent Number: 5,181,980
[45] Date of Patent: Jan. 26, 1993

[54] METHOD OF MANUFACTURING SKIN COVER FOR SEAT

[75] Inventor: Norio Yanagishita, Ayase, Japan

[73] Assignee: Ikeda Bussan Co., Ltd., Kanagawa, Japan

[21] Appl. No.: 776,903

[22] Filed: Oct. 16, 1991

Related U.S. Application Data

[63] Continuation-in-part of Ser. No. 440,033, Nov. 21, 1989.

[30] Foreign Application Priority Data

Dec. 24, 1988 [JP] Japan .................. 63-326672

[51] Int. Cl.$^5$ ............................................. B32B 31/04
[52] U.S. Cl. ........................... 156/93; 156/214; 156/285; 264/511; 297/DIG. 2
[58] Field of Search ............. 264/510, 511, 101; 156/285, 212, 214, 222, 245, 93; 297/DIG. 1, DIG. 2, 219, 220, 225, 228, 229

[56] References Cited

U.S. PATENT DOCUMENTS

| | | | |
|---|---|---|---|
| 3,817,806 | 6/1974 | Anderson et al. | 264/511 X |
| 3,878,277 | 4/1975 | Velte | 297/DIG. 2 |
| 4,002,520 | 1/1977 | Fenton | 156/285 X |
| 4,116,736 | 9/1978 | Sanson et al. | 156/285 X |
| 4,201,612 | 5/1980 | Figge et al. | 156/285 X |
| 4,474,725 | 10/1984 | Sands | 264/511 X |
| 4,740,417 | 4/1988 | Tornero | 264/511 X |
| 4,758,294 | 7/1988 | Storch | 156/212 X |

FOREIGN PATENT DOCUMENTS

| | | |
|---|---|---|
| 991350 | 5/1965 | United Kingdom . |
| 1023880 | 3/1966 | United Kingdom . |
| 1128855 | 10/1968 | United Kingdom . |
| 1325622 | 8/1973 | United Kingdom . |
| 1415852 | 11/1975 | United Kingdom . |
| 1458664 | 12/1976 | United Kingdom . |
| 1497450 | 1/1978 | United Kingdom . |
| 2202436 | 9/1988 | United Kingdom . |
| 2219964 | 12/1989 | United Kingdom . |

*Primary Examiner*—Michael W. Ball
*Assistant Examiner*—Michele K. Yoder
*Attorney, Agent, or Firm*—Weiser & Stapler

[57] ABSTRACT

A method of manufacturing a skin cover capable of making desired curved portions on the skin cover without deforming or damaging the skin cover and without creating wrinkles on the skin cover. The method includes the steps of placing one of the surface skin and the wadding along a manufacturing surface having a shape corresponding to the curved sections such that the one of the surface skin and the wadding is kept in a desired curved shape; and attaching another one of the surface skin and the wadding to the one placed along the manufacturing surface to obtain the skin cover in the desired curved shape.

5 Claims, 1 Drawing Sheet

METHOD OF MANUFACTURING SKIN COVER FOR SEAT

This application is a continuation-in-part of application Ser. No. 07/440,033 filed Nov. 21, 1989.

BACKGROUND OF THE INVENTION

1. Field of the Invention

The present invention relates to a method of manufacturing a skin cover for a seat which is suitable as a car seat.

2. Description of the Background Art

Usually, a skin cover for a car seat comprises a surface skin made of cloth material and a wadding attached on a back of the surface skin made of synthetic resin sheet material. The surface skin and the wadding are attached together to be a manufactured skin cover by means of adhesive containing thermoplastic resin or thermosetting resin.

Usually, such a manufactured skin cover is then cut into pieces corresponding to different portions of a seat having different shapes, which are sewn together in a shape fitting an overall shape of the seat.

However, in a conventional process of sewing together such pieces cut out from a flat skin cover, it has been difficult to make curved portions. Furthermore, in placing the skin cover over a molding surface of a manufacturing mold over which liquid foam resin to become a pad member of the seat is to be poured such that a skin covered foamed plastic seat can be obtained, it has been difficult to place the skin cover along curved sections of the molding surface, and wrinkles often appeared on the surface skin of the skin cover of the manufactured seat.

On the other hand, when the skin cover is thermally pressed into curved shape, one of the surface skin and the wadding receives a stretching force while the other one receives a compressing force, so that wrinkles often appeared on the one of the surface skin and the wadding which receives the compressing force. In addition, the surface skin and the wadding may be deformed or damaged in such a thermal press process.

SUMMARY OF THE INVENTION

It is therefore an object of the present invention to provide a method of manufacturing a skin cover capable of making desired curved portions on the skin cover without deforming or damaging the skin cover and without creating wrinkles on the skin cover, such that the feel of the skin cover as well as the efficiency of manufacturing can be improved, which is also economically preferable as a number of inferior products can be reduced.

This object is achieved in the present invention by providing a method of manufacturing a skin cover comprising a surface skin and a wadding attached on a back of the surface skin, the skin cover incorporating at least one curved section, the method comprising the steps of placing one of the surface skin and the wadding along a manufacturing surface having a shape corresponding to the curved section such that the one of the surface skin and the wadding is kept in a desired curved shape; and attaching another one of the surface skin and the wadding to the one placed along the manufacturing surface to obtain the skin cover in the desired curved shape.

Other features and advantages of the present invention will become apparent from the following description taken in conjunction with the accompanying drawings.

DETAILED DESCRIPTION OF THE PREFERRED EMBODIMENT

Figure 1:
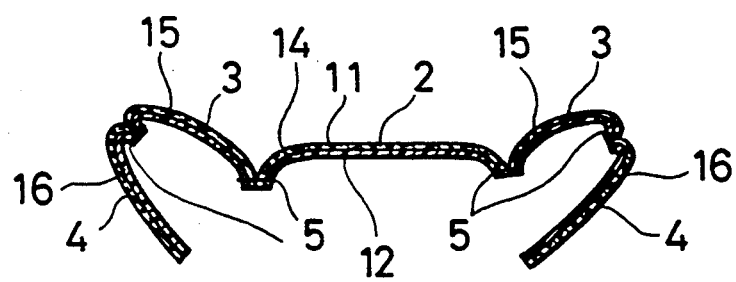
FIG. 1 is a cross sectional view of a skin cover to be manufactured by a method according to the present invention.

Referring now to FIG. 1, there is shown a skin cover to be manufactured by a method according to the present invention.

This skin cover 1, which is to be used for a seat cushion, comprises a main portion 2, side portions 3 and side gore portions 4, which are sewn together at sewn portions 5, taken here as an example of division in accordance with different portions of a seat for which the skin cover 1 is to be used.

Each of the main portion 2, side protions 3, and side gore portions 4 is made from a surface skin 11 made of cloth material and a wadding 12 made of synthetic resin material, and is manufactured by attaching the respective surface skin and wadding and at the same time making curves 14, 15, and 16, respectively, before being sewn together at the sewn portions 5.

This manufacturing to attach the surface skin 11 and the wadding 12 and at the same time to make the curves 14, 15, and 16 on the main portion 2, side portions 3, and side gore portions 4, respectively, will now be described with reference to FIGS. 2 and 3.

Figure 2:
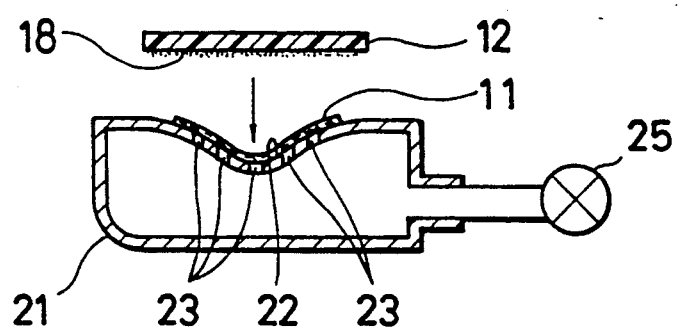
FIG. 2 is a cross sectional view of a manufacturing mold at one stage in a process of manufacturing the skin cover of FIG. 1 in a method according to the present invention.

To manufacture the main portion 2, the surface skin 11 for the main portion 2 is placed over a manufacturing surface 22 of a vacuum manufacturing mold 21, as shown in FIG. 2. This manufacturing surface 22 of the vacuum manufacturing mold 21 has a shape corresponding to the curve 14 to be made on the main portion 2, and has a plurality of vacuum suction holes 23 which are connected with a vacuum pump 25.

Then, the vacuum pump 25 is activated so that the surface skin 11 for the main portion 2 placed over the manufacturing surface 22 of the vacuum manufacturing mold 21 is pulled toward the manufacturing surface 22 to keep the surface skin 11 in a desired shape along the shape of the manufacturing surface 22. To accomplish this, the suction force applied by the vacuum pump 25 need only have a strength which is sufficient to pull the surface skin 11 to the manufacturing surface 22 prior to application of the wadding 12 thereto.

Figure 3:
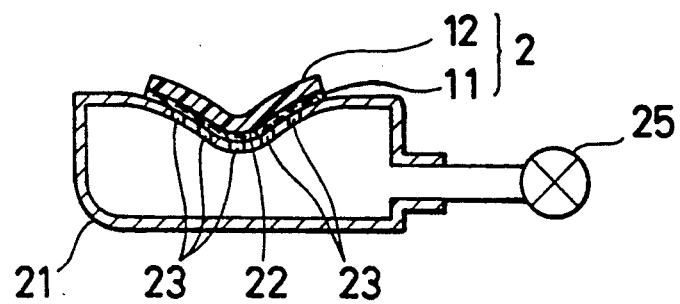
FIG. 3 is a cross sectional view of a manufacturing mold at another stage in a process of manufacturing the skin cover of FIG. 1 in a method according to the present invention.

In this state, the wadding 12 with adhesive 18 spread over a side to make contact with the surface skin 11 is placed over the surface skin 11, as shown in FIG. 3, so that the main portion 2 comprising the surface skin 11 and the wadding 12 can be obtained in a desired shape.

The side portions 3 and the side gore portions 4 can also be manufactured in similar manner, and the manufactured main portion 2, side portions 3, and the side gore portions 4 are sewn together at the sewn portions 5 to obtain the skin cover 1.

The skin cover 1 thus obtained can then be used to cover a pad member to make the seat cushion, or can be placed over a molding surface of a manufacturing mold over which liquid foam resin to become a pad member of the seat is to be poured such that a skin covered foamed plastic seat can be obtained, in which case the skin cover 1 can be placed smoothly along the molding surface of the manufacturing mold.

Thus, according to this embodiment, the surface skin 11 is placed along the manufacturing surface 22 where the surface skin 11 is kept in a desired shape, and then the wadding 12 is attached to the surface skin 11 while the surface skin 11 is in this desired shape, so that it is possible to provide a method of manufacturing a skin cover capable of making desired curved portions on the skin cover without deforming or damaging the skin cover and without creating wrinkles on the skin cover, such that the feel of the skin cover as well as the efficiency of manufacturing can be improved, which is also economically preferable as the number of inferior products can be reduced.

It is to be noted that the present invention is equally applicable to the skin cover for a seat back or a head rest, rather than for the seat cushion as in the above embodiment.

It is also to be noted that the division of the skin cover into the main portion, side portions, and side gore portions is just an example, and can be altered without affecting the improvements of the present invention.

Also, the side gore portions may be made from a single piece rather than from the surface skin and the wadding as in the above embodiment.

In addition, the wadding may be placed first on the vacuum manufacturing mold rather than the surface skin as in the above embodiment.

Furthermore, the vacuum manufacturing mold in the above embodiment may be replaced by other equivalent means for furnishing the same end result.

Moreover, the attaching of the surface skin and the wadding may be done by press manufacturing instead of the using the adhesive as in the above embodiment.

Besides this, many modifications and variations of the above embodiments may be made without departing from the novel and advantageous features of the present invention. Accordingly, all such modifications and variations are intended to be included within the scope of the appended claims.

I claim:

1. A method of manufacturing a skin cover comprising a surface skin and a wadding attached on a back of the surface skin, the surface skin and the wadding initially having shapes which are flat and two-dimensional, the skin cover incorporating at least one section which is curved and three-dimensional, and the method comprising the steps of:

placing one of the surface skin and the wadding which is originally flat and two-dimensional in contact with a manufacturing surface having a curved shape corresponding to the three-dimensionally curved section of the skin cover and which includes a plurality of suction means for applying a suction force having a strength which is only sufficient to keep said one of the surface skin and the wadding in said curved shape, drawing said one of the surface skin and the wadding placed in contact with the manufacturing surface tightly to the manufacturing surface by the suction force applied by the suction means, and forming said one of the surface skin and the wadding in said curved shape; and attaching the other one of the surface skin and the wadding to said one of the surface skin and the wadding placed in contact with the manufacturing surface, along said curved shape in which said one of the surface skin and the wadding is formed, to obtain the skin cover incorporating said curved section.

2. The method of claim 1, wherein the plurality of suction means are activated by a vacuum pump.

3. The method of claim 1, further comprising the steps of:

dividing the skin cover into a number of pieces before the placing and the attaching, each piece incorporating at least one curved section and being separately manufactured by the placing step and the attaching step; and putting the number of pieces together after each of the pieces is manufactured in the desired shape by the placing step and the attaching step, to obtain the skin cover in the desired shape.

4. The method of claim 3, wherein the number of pieces are sewn together.

5. The method of claim 1, further comprising the step of drawing said one of the surface skin and the wadding into contact with the manufacturing surface after the placing step and before the attaching step.

* * * * *